(12) United States Patent
Myers

(10) Patent No.: US 8,714,495 B2
(45) Date of Patent: May 6, 2014

(54) BUILDING STRUT SYSTEM

(75) Inventor: Philip Allen Myers, Oak Ridge, NC (US)

(73) Assignee: Philip Allen Myers, Oak Ridge, NC (US)

( * ) Notice: Subject to any disclaimer, the term of this patent is extended or adjusted under 35 U.S.C. 154(b) by 270 days.

(21) Appl. No.: 12/800,928

(22) Filed: May 26, 2010

(65) Prior Publication Data

US 2010/0301178 A1 Dec. 2, 2010

Related U.S. Application Data

(60) Provisional application No. 61/217,673, filed on Jun. 3, 2009, provisional application No. 61/217,142, filed on May 27, 2009, provisional application No. 61/217,141, filed on May 27, 2009.

(51) Int. Cl.
*F16L 3/08* (2006.01)
(52) U.S. Cl.
USPC ............ 248/74.1; 248/300; 52/364; 52/716.1
(58) Field of Classification Search
USPC .......... 248/74.1, 243, 300, 220.31, 224.8, 72; 52/363, 364, 836, 831, 717.06, 716.1
See application file for complete search history.

(56) References Cited

U.S. PATENT DOCUMENTS

| | | | |
|---|---|---|---|
| 2,375,513 A | 5/1945 | Bach | |
| 2,470,992 A | 1/1948 | Kindorf | |
| 2,448,109 A * | 8/1948 | Michael | ........................... 52/364 |
| 2,660,385 A * | 11/1953 | Moran | ........................... 248/643 |
| 2,933,196 A * | 4/1960 | Childs | ........................... 211/183 |
| 3,353,316 A * | 11/1967 | Berg | ........................... 52/302.3 |
| 3,463,428 A | 8/1969 | Kindorf | |
| 3,477,187 A * | 11/1969 | Fruman | ........................... 52/346 |
| 3,547,385 A | 12/1970 | Kindorf | |
| 3,687,407 A | 8/1972 | Dickerson | |
| 4,185,802 A | 1/1980 | Myles | |
| 4,266,384 A * | 5/1981 | Orals et al. | ........................... 52/410 |
| 4,271,643 A * | 6/1981 | Sweers | ........................... 52/11 |
| 4,516,296 A | 5/1985 | Sherman | |
| 4,708,554 A | 11/1987 | Howard | |
| 5,118,069 A * | 6/1992 | Muhlethaler | ........................... 248/613 |
| 5,141,186 A | 8/1992 | Cusic | |
| 5,165,628 A | 11/1992 | Todd | |

(Continued)

OTHER PUBLICATIONS

Examples of Common Building Strut Hangers and Clamps. Multiple sources. sheets.

*Primary Examiner* — Anita M King
(74) *Attorney, Agent, or Firm* — Smith Moore Leatherwood LLP; Philip P. McCann; John P. Zimmer

(57) ABSTRACT

This invention allows attachment of strut channels 2, pipes, conduit, and mounting of equipment to the interior of buildings and other structures. Attachment to structures such as I-Beams, channels, structural angles, purlins and truss structures are improved. Extended use of self tapping screws 28 and commonly used metal strapping are enabled. The use of dimpled holes 7 facilitate insertion of self tapping screws 28 thus expanding their function. Tab cut outs 6 in attachment hardware that allow strapping to pass and hook provide new and efficient methods for using standard strapping. New mounting hardware in combination with beam clamps, another invention of mine, use the beam clamps along with appropriate accessories, which are part of that invention, to provide new methods of attachment. Strut channels 2 are changed to integrate the use of these improvements.

3 Claims, 10 Drawing Sheets

(56) References Cited

U.S. PATENT DOCUMENTS

Figure 1:
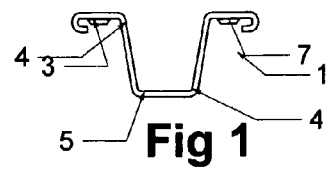

| | | | |
|---|---|---|---|
| 5,303,887 A | 4/1994 | Hasty | |
| 5,307,601 A * | 5/1994 | McCracken | 52/364 |
| 5,385,320 A | 1/1995 | Ismert | |
| 5,704,571 A * | 1/1998 | Vargo | 248/58 |
| 5,799,907 A * | 9/1998 | Andronica | 248/62 |
| 5,927,041 A * | 7/1999 | Sedlmeier et al. | 52/836 |
| 5,971,329 A | 10/1999 | Hickey | |
| 2006/0038398 A1 | 2/2006 | Whipple | |

* cited by examiner

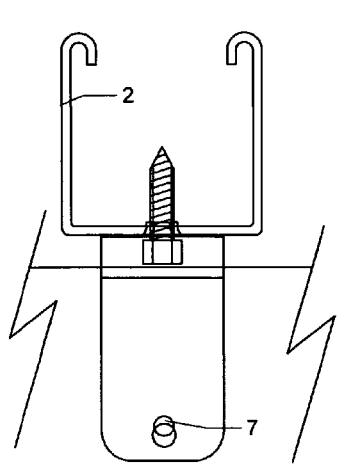
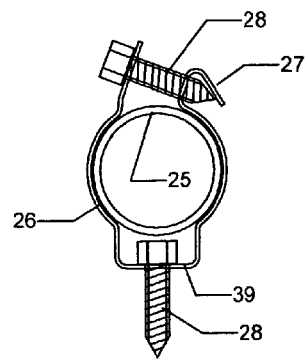
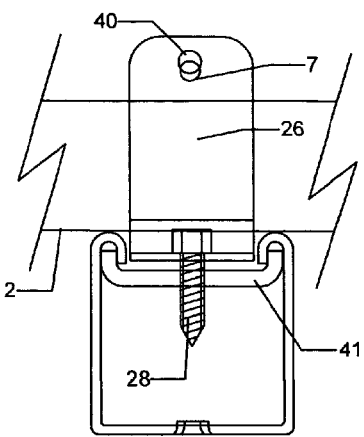
Fig 26  Fig 27  Fig 28
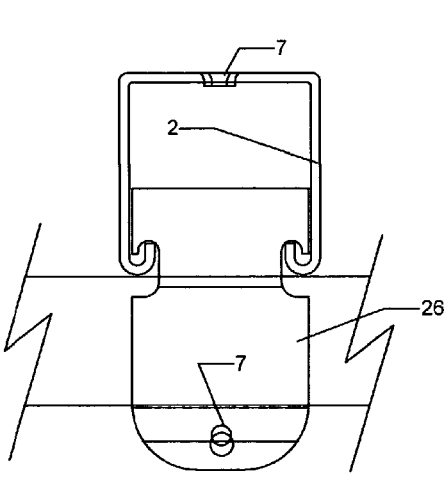
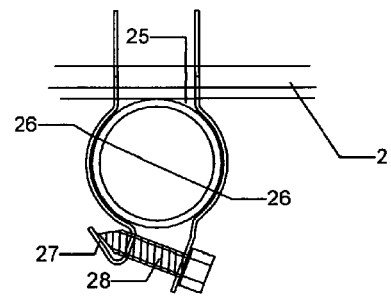
Fig 29  Fig 30

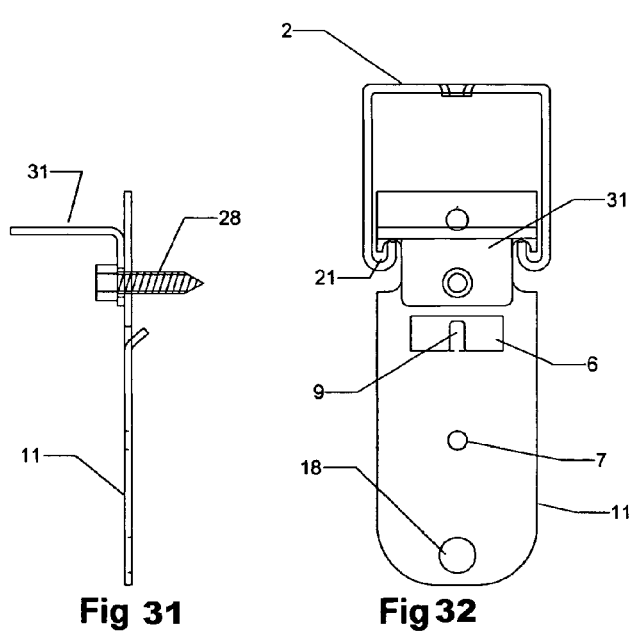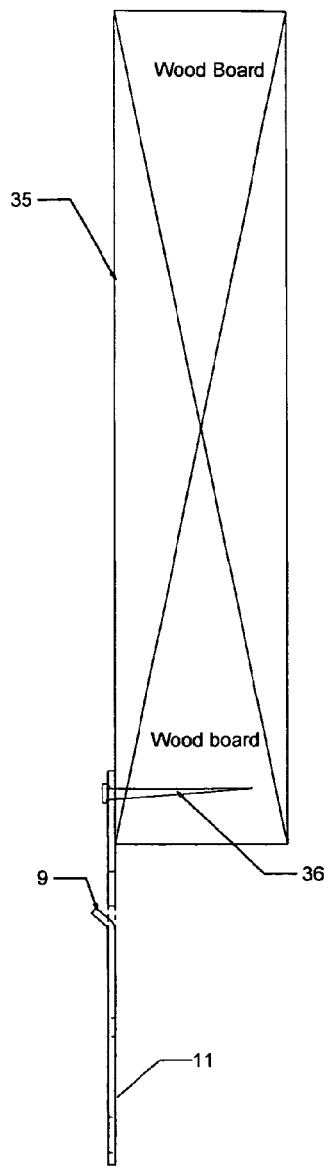
Fig 31   Fig 32   Fig 33

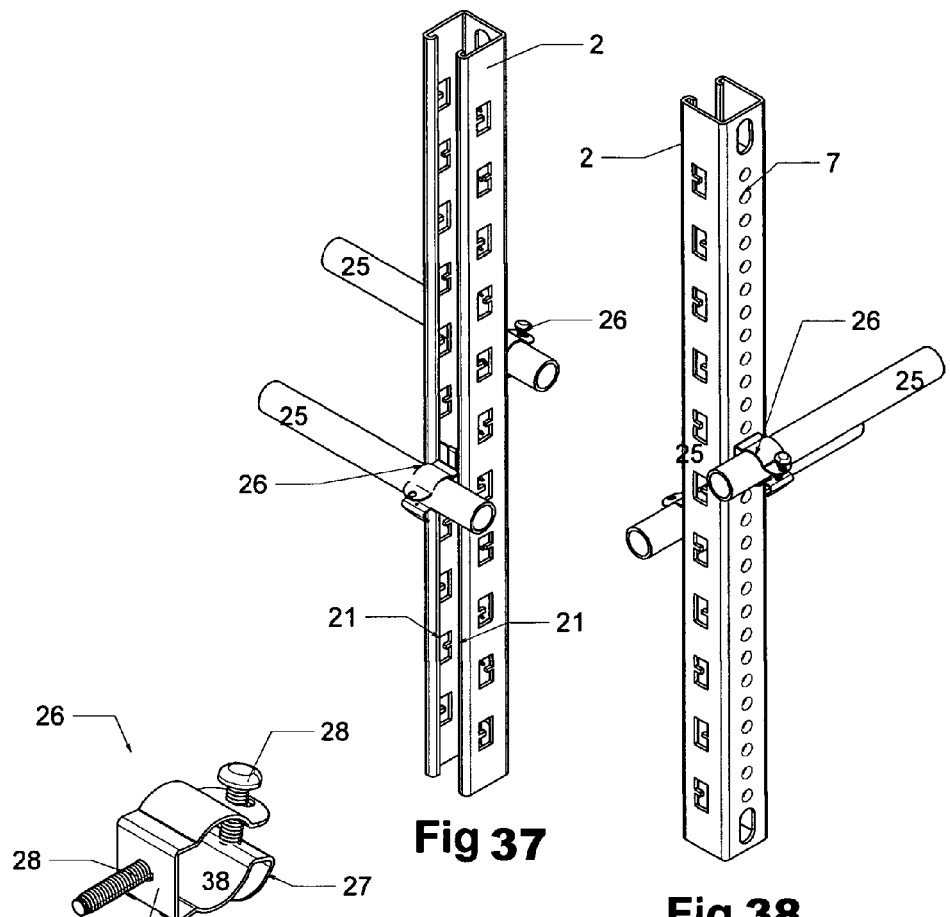
Fig 37
Fig 39
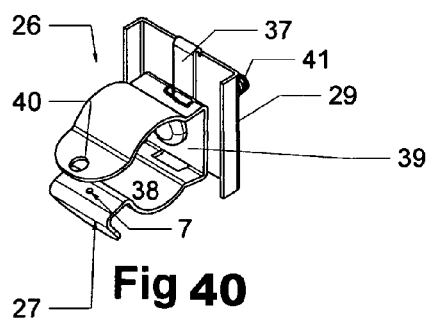
Fig 40
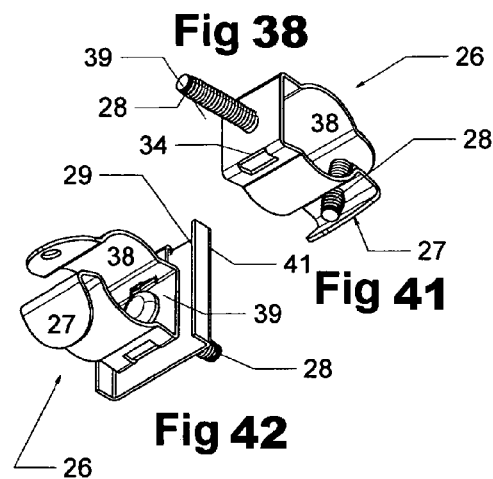
Fig 38
Fig 41
Fig 42

BUILDING STRUT SYSTEM

CROSS-REFERENCE TO RELATED APPLICATIONS

Provisional patent application 61/217,673 filed on Jun. 3, 2009 and provisional patent applications 61/217,142 with a filing date of May 27, 2009 and 61/217,141 filed on May 27, 2009 and being submitted as a non provisional patent application along with this application.

FEDERALLY SPONSORED RESEARCH

Not Applicable

SEQUENCE LISTING OR PROGRAM

Not applicable

BACKGROUND

1. Field

This application relates to the attaching of structural and accessory members to each other, specifically for attaching a member or object to beams or other structural configurations, primarily for holding hardware in place in various building structures.

2. Background

Channel struts are the basis of a system of supporting and attaching a variety of items such as pipes, electrical devices, lighting equipment, heating fixtures, cables, conduit, duct, and other channel struts, for example, from a variety of structural members such as I-beams, T-bars, steel trusses and other structural shapes. Channel struts are normally attached to I-beams and flanged structures at a right angle to the edge of the flange of the beam. Various clamps, hangers, and brackets are used in buildings for attaching piping systems, conduits, heating and air conditioning equipment, throughout the building. Strut channels are found in most commercial building and provide a common interface between the structures of buildings and the equipment and hardware being installed in the buildings.

Strut Channels were first developed around 1920. The last significant era of development of accessory items that interface with strut channels happened in the 1950's. Some development of methods for attaching continued but can be considered minor compared to the initial invention. The concept has not advanced with other changes of methods commonly used in the construction of buildings and attachment of hardware within. One recent trend in construction has been the use of rechargeable drills or drivers. This is one of the utilities that my invention addresses by providing a means to facilitate insertion of self-tapping fasteners.

It is very common for wall mounts and mounting brackets or assemblies to be made up on construction sites providing a means for holding pipes or conduits directly or to support strut channel to hold other items. Another utility of my invention is to provide a universal wall mount that is highly flexible in use which also makes it more suited to be mass-produced.

My invention allows for a number of functions to be easily accomplished that are not currently feasible. My invention enables simple existing clamps and straps to be directly attached to the struts as well as new styles of clamps and clips that are designed specifically for such use. Accessory items also provide new ways to attach pipes, conduits, boards and other members. These accessories, which I have referred to my patent application for "Beam Clamps," include: cross members, adapters, shields, insulation and protective padding materials.

Another advantage of this invention is that it allows seamless integration of new hardware and methods with existing hardware and mounting systems.

Method Utilities Ensuing from the Embodiments of the Invention:

Method of mounting hardware along a wall: The universal wall mount provides the means to attach hardware to walls for running multiple conduits, pipes, strut channels either vertically or horizontally along the walls. Other equipment, shelves, and tabletops, can be attached. Along with most existing hardware, "Beam Clamps," another invention of mine, can be attached to the universal wall mount. A strut channel or V-strut can be attached to the wall plate.

Method of mounting hardware in new ways: The V-strut provides the means to attach hardware to structures for running multiple conduits, pipes, strut channels either vertically or horizontally. Most existing hardware along with "Beam Clamps," another invention of mine, can be attached to the V-strut.

Method of attaching and hanging hardware using common hanger strapping: A tab incorporated in a cutout in hardware such as strut channel, V-strut, clamps, and clips provide a quick way to hang hardware using strapping that has holes arranged along its center. The strap can be hooked at an initial level then quickly readjusted as needed.

Method of attaching clamps, strapping, and other hardware using a power driver for engaging a self-tapping fastener: A hole with a recessed dimple to direct the tip of a screw into the hole, can be incorporated into strut channels, V-struts, clamps, clips or any sufficiently strong surface, enabling efficient use of a power driver to attach the many existing and new clamps and straps. A protective tab or flange on the receiving side of a clamp protects the tip of a screw from human contact. A retainer allows the same clamps used on the surface of the closed side of the strut channel to be attached to the open side of the strut channel.

Method of quickly providing a way to attach threaded hanger rod from a strut channel anywhere along its length without the need for included holes: A clip that hooks on the inside of strut channels with a hole in a flange provides this capability. One version of this clip mounts in line with the interior flange of the strut channel and the other version mounts crosswise, engaging both sides of the strut channel.

The preferred use of this invention combines the use of either the V-strut and or the channel strut with the added enhancements of this invention, and the use of the pipe clamps and clips using self tapping screws as a system of attaching hardware together and to the structure of a building.

SUMMARY

This invention improves the utility of existing hardware and provides a new set of hardware that adds capabilities and flexibility to construction accessory attachment means. Both existing and new hardware can be combined to significantly enhance methods for attaching hardware together onto building structures and supporting other hardware.

DRAWINGS

Figures

FIG. 1 End view of a V-strut.

Figure 2:
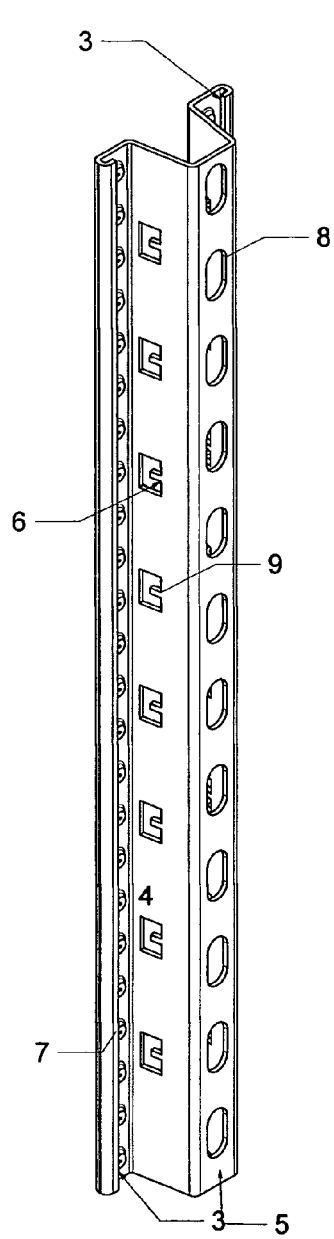

FIG. 2 Isometric view of a V-strut support member.

Figure 3:
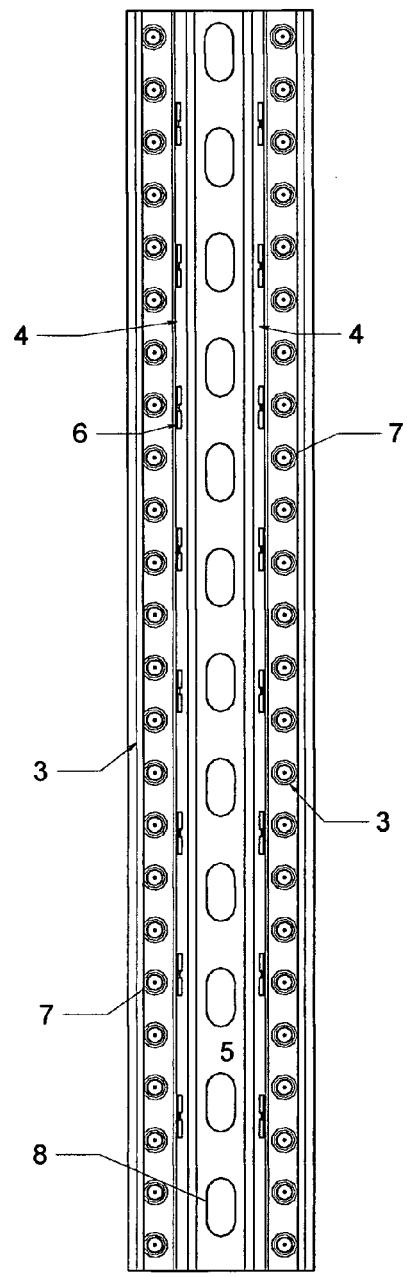

FIG. 3 Plan view of a V-strut support member.

Figure 4:
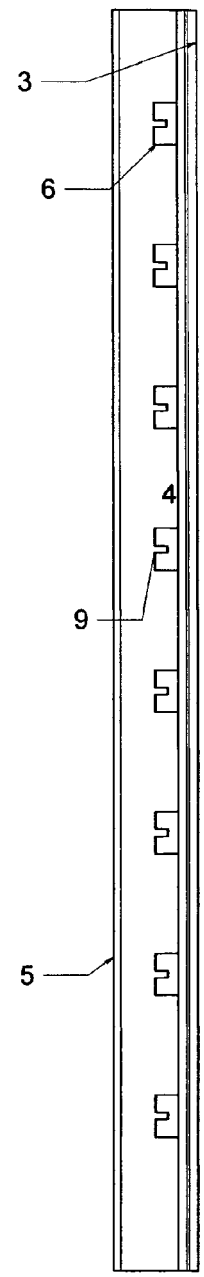

FIG. 4 Side view of a V-strut support member.

Figure 5:
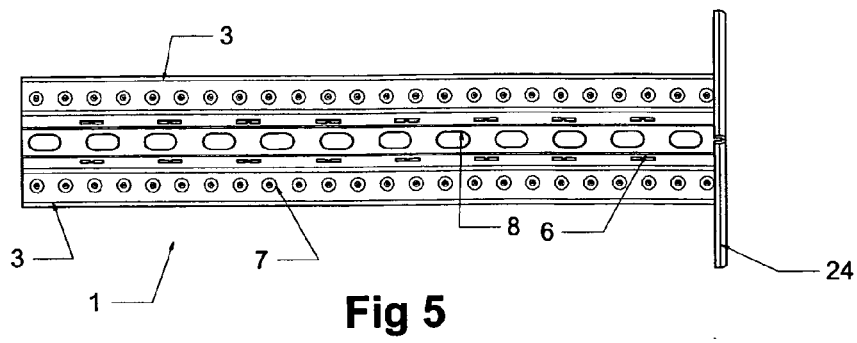

FIG. 5 Plan view of a universal wall mount that incorporates a length of V-strut attached to a mounting plate capable of being attached to a vertical surface in any direction.

Figure 6:
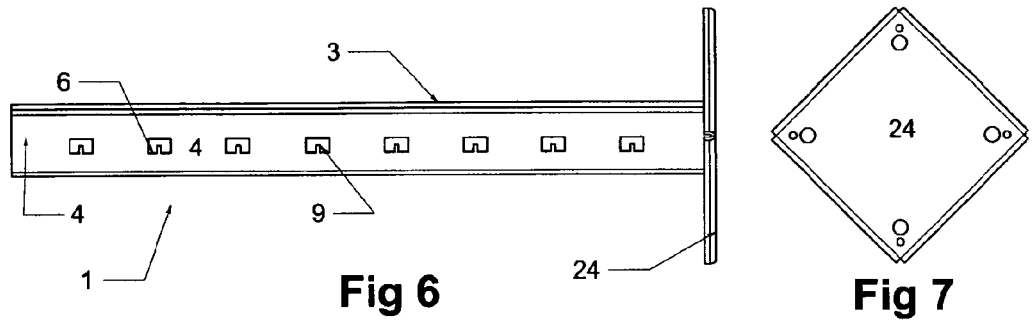

FIG. 6 Side view of a universal wall mount that incorporates a length of V-strut attached to a mounting plate capable of being attached to a vertical surface in any direction.

Figure 7:
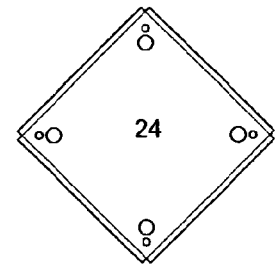

FIG. 7 Mounting Plate view of a universal wall mount that incorporates a length of V-strut attached to a mounting plate capable of being attached, to a vertical surface in any direction.

Figure 8:
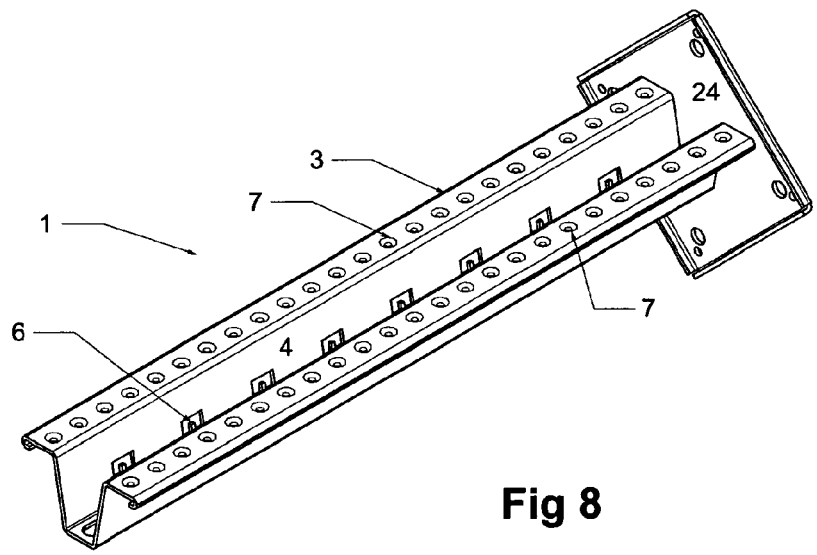
Figures 9, 10, 11, 12, 13:
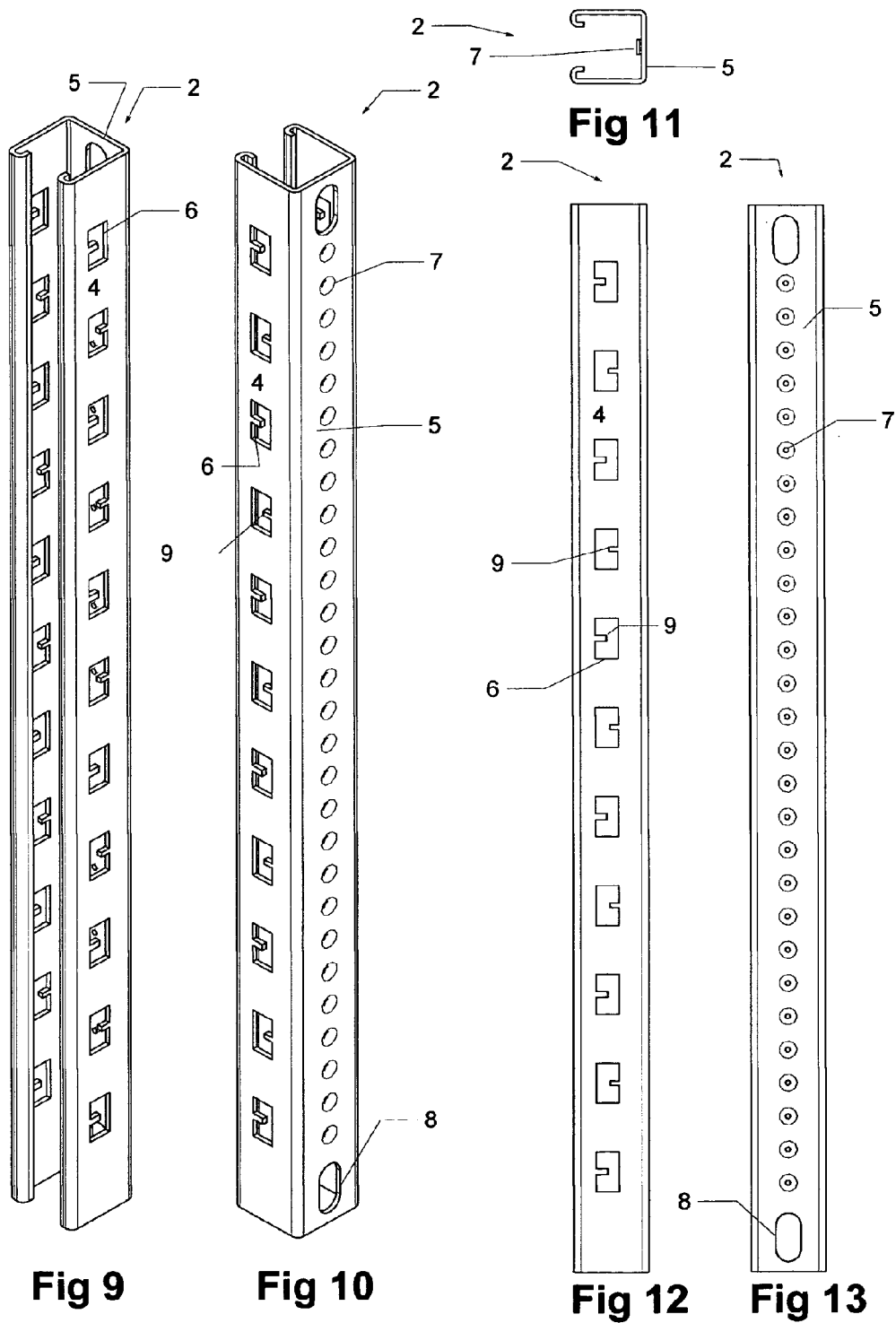

FIG. 8 Isometric view of a universal wall mount that incorporates a length of V-strut attached to a mounting plate capable of being attached to a vertical surface in any direction FIG. 9 Isometric view of a strut channel, from the open side, that includes a tab cutout on both sides to allow hanging of straps with holes and includes dimpled holes configured to facilitate attachments using self tapping screws.

FIG. 10 Isometric view of a strut channel, from the closed side, that includes a tab cutout on both sides to allow hanging of straps with holes and includes dimpled holes configured to facilitate attachments using self-tapping screws.

FIG. 11 End view of a strut channel, from the closed side, that includes a tab cutout on both sides to allow hanging of straps with holes and includes dimpled holes configured to facilitate attachments using self tapping screws.

FIG. 12 Side view of a strut channel that includes a tab cutout on both sides to allow hanging of straps with holes.

FIG. 13 Plan view of a strut channel, from the closed side, that includes dimpled holes configured to facilitate attachments using self-tapping screws.

Figure 14:
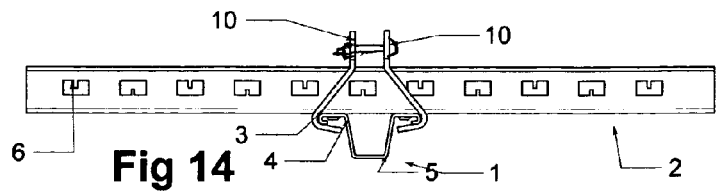

FIG. 14 End view as seen from the end of a V-strut that shows a channel strut fastened crosswise to the V-strut using a beam clamp.

Figure 15:
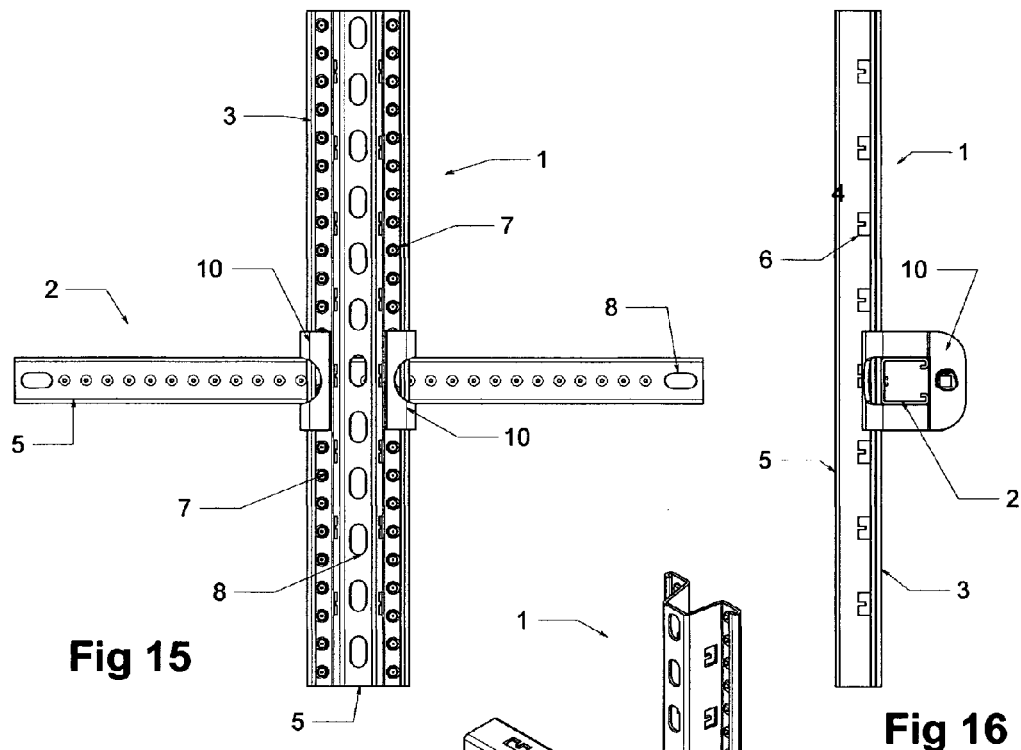

FIG. 15 Plan view as seen from the closed side of a V-strut that shows a channel strut fastened crosswise to the V-strut using a beam clamp.

Figure 16:
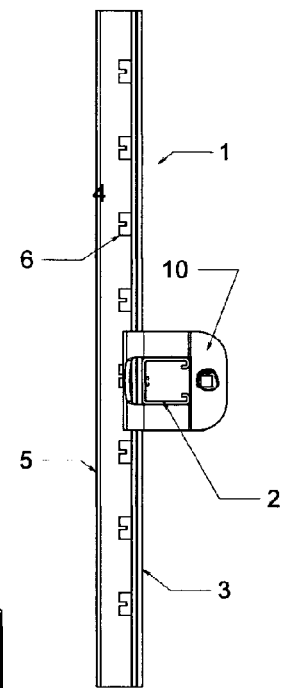

FIG. 16 Side view as seen from the end of a strut channel that shows a strut channel fastened crosswise to the V-strut using a beam clamp.

Figure 17:
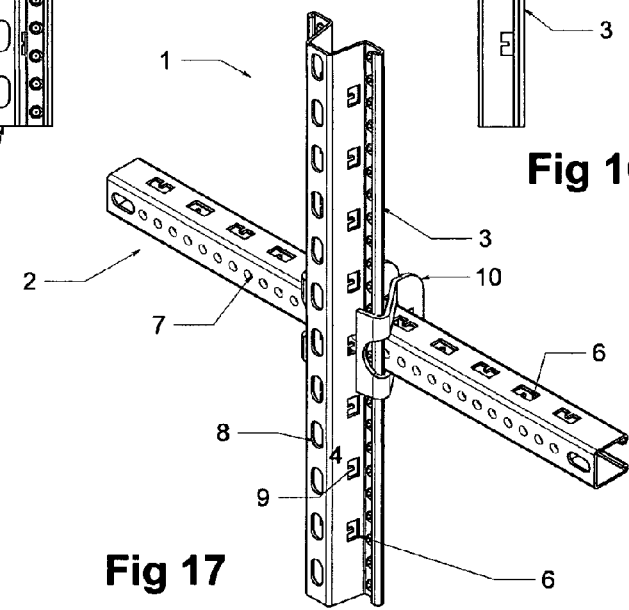

FIG. 17 Isometric view as seen from the closed side of a V-strut that shows a channel strut fastened crosswise to the V-strut using a beam clamp.

Figure 18:
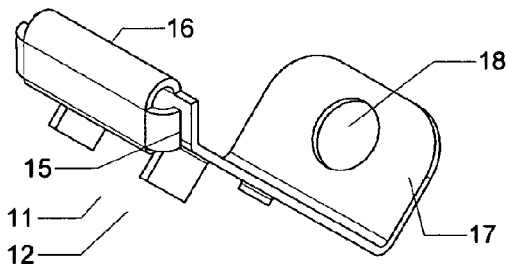

FIG. 18 Isometric view from the upper rear side of a hanger clip capable of attaching to the inside of the strut channel supporting either a threaded hanger or a hanger strap with holes. This clip is in the pre bent configuration.

Figure 19:
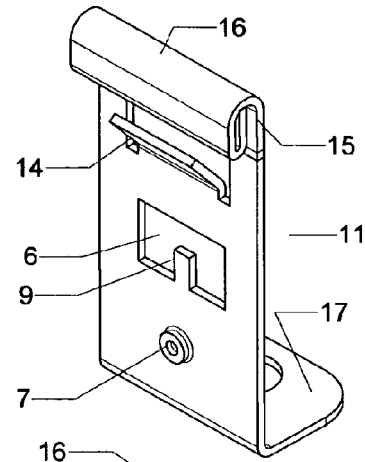

FIG. 19 Isometric view from the upper rear side of a hanger clip capable of attaching to the inside of the strut channel supporting either a threaded hanger or a hanger strap with holes. This clip is in the straightened configuration.

Figure 20:
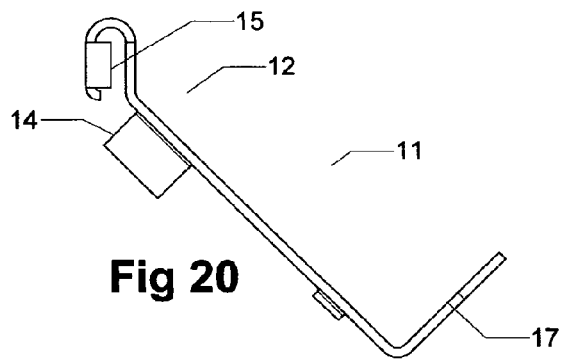

FIG. 20 End view of a hanger clip capable of attaching to the inside of the strut channel supporting either a threaded hanger or a hanger strap with holes. This clip is in the pre bent configuration.

Figure 21:
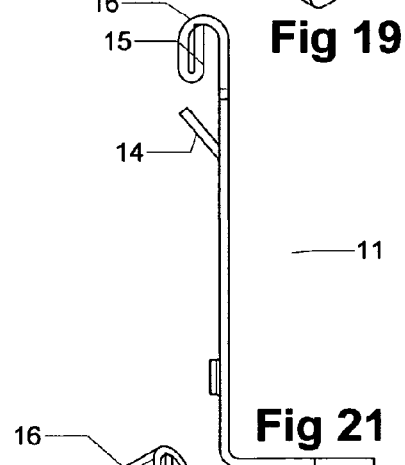

FIG. 21 End view of a hanger clip capable of attaching to the inside of the strut channel supporting either a threaded hanger or a hanger strap with holes. This clip is in the straightened configuration.

Figure 22:
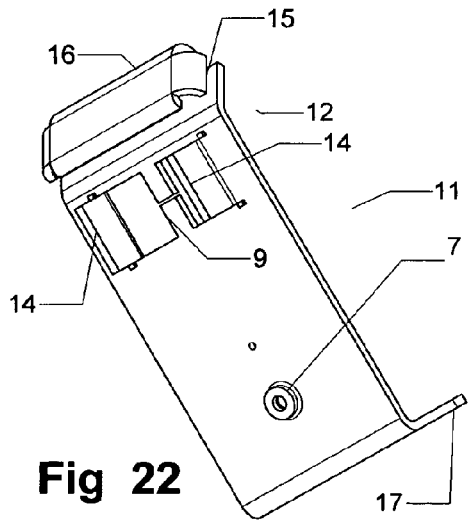

FIG. 22 Isometric view of a hanger clip capable of attaching to the inside of the strut channel supporting either a threaded hanger or a hanger strap with holes. This clip is in the pre bent configuration.

Figure 23:
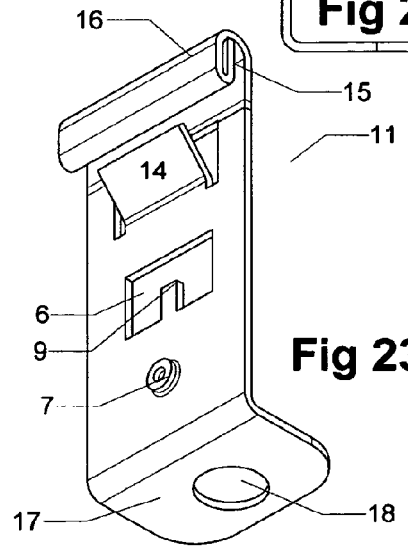

FIG. 23 Isometric view of a hanger clip capable of attaching to the inside of the strut channel supporting either a threaded hanger or a hanger strap with holes. This clip is in the straightened configuration.

Figure 24:
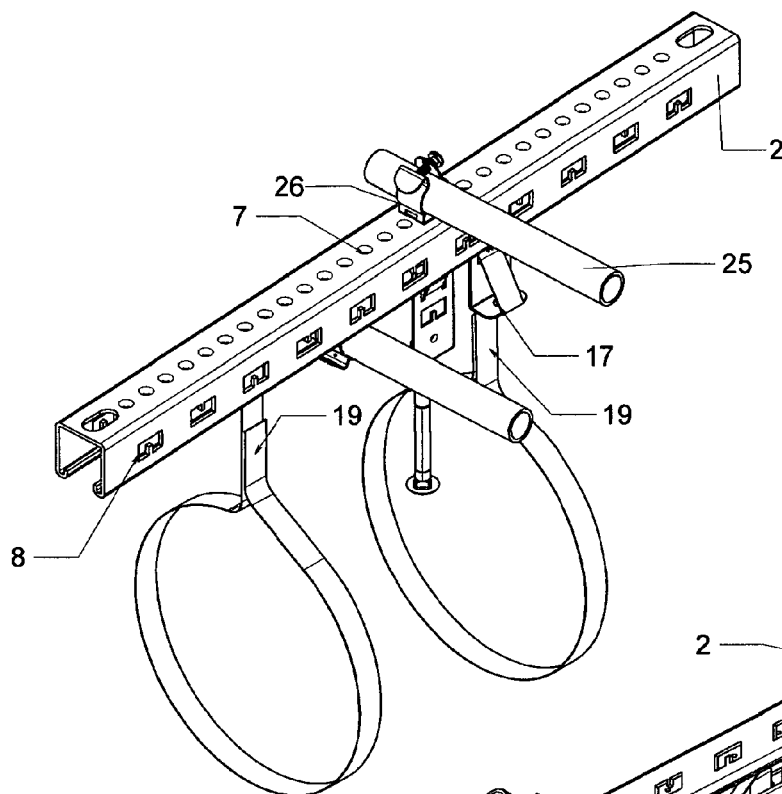

FIG. 24 Isometric view of a strut channel from the closed side that includes a hanger clip attached and supporting, a strap hanger, a strap hanger attached through a tab cut out on the side, and pipe clamp attaching a pipe across the closed side of the strut channel using self tapping screws through the dimpled holes.

Figure 25:
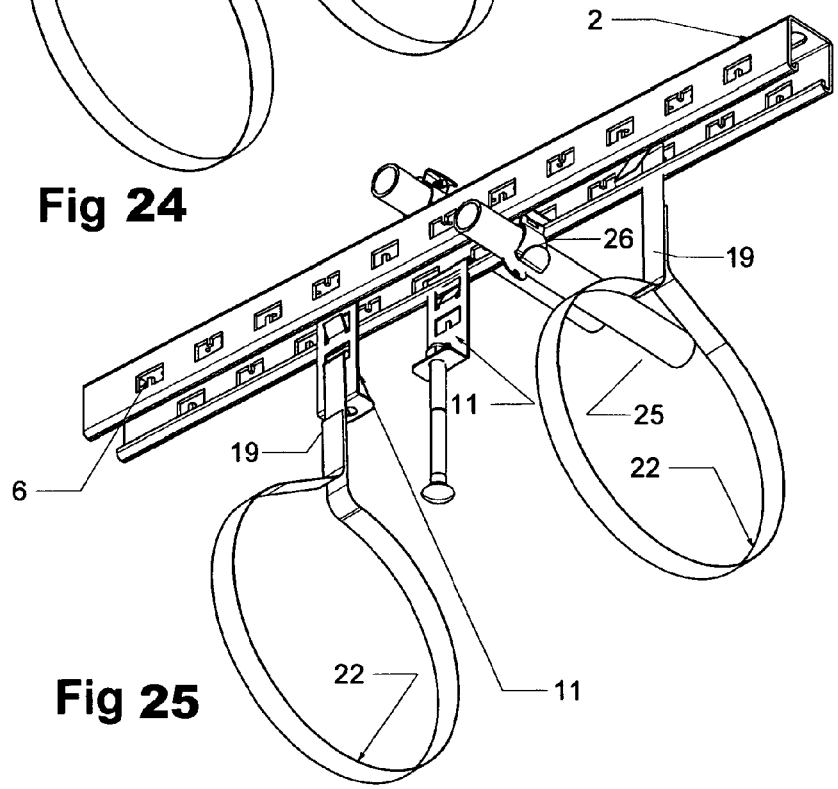

FIG. 25 Isometric view of a strut channel from the open side that includes a hanger clip attached and supporting, a strap hanger, a strap hanger attached through a tab cut out on the side, and pipe clamp attaching a pipe across the closed side of the strut channel using self tapping screws through the dimpled holes.

FIG. 26 Side view of a pipe clamp that is attached to a channel strut using a self tapping screw. The screw is inserted through the pipe clamp into a dimpled hole in the channel strut.

FIG. 27 End view of a pipe and a pipe clamp that shows a tip protector tab bent down to protect the self-tapping screw.

FIG. 28 End view of a strut channel that has a pipe clamp attaching a pipe across the open side of the strut channel using a self tapping screw through the dimpled holes in a strut clamp retainer that grips the inside flanges of the strut channel.

FIG. 29 End view of a strut channel that has a two piece pipe clamp with opposing strut clip hook for hooking the inside flanges of the strut channel there by attaching a pipe across the open side of the strut channel.

FIG. 30 Side view, of what is seen in FIG. 37, of a strut channel that has a two piece pipe clamp with opposing strut clip hook for hooking the inside flanges of the strut channel there by attaching a pipe across the open side of the strut channel.

FIG. 31 The end view of a clip with a bent retainer attached using a self tapping screw. Shown before the hanger flange with a hanger hole is bent.

FIG. 32 End view of a strut channel that includes a hanger clip attached inside of a strut channel held in place by a bent retaining clip.

FIG. 33 The same hanger clip as is in FIG. 31 is fastened to a wood member.

Figure 34:
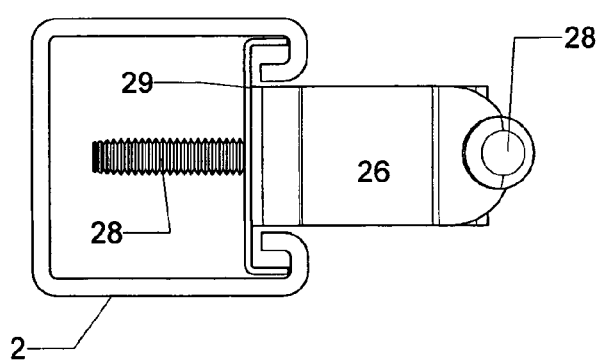

FIG. 34 Isometric exploded view of self-tapping screw style of clamp that includes a strut clamp retainer that allows attachment to the strut channel.

Figure 35:
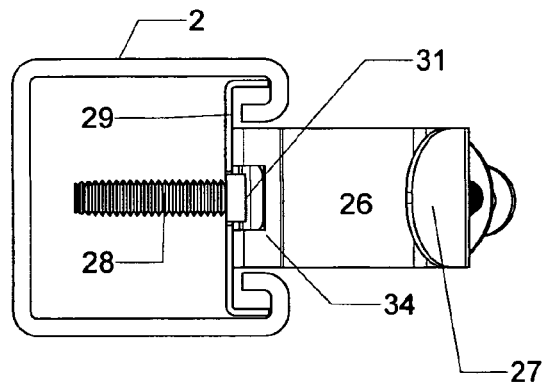

FIG. 35 End view of pipe clamp and strut channel assembly.

Figure 36:
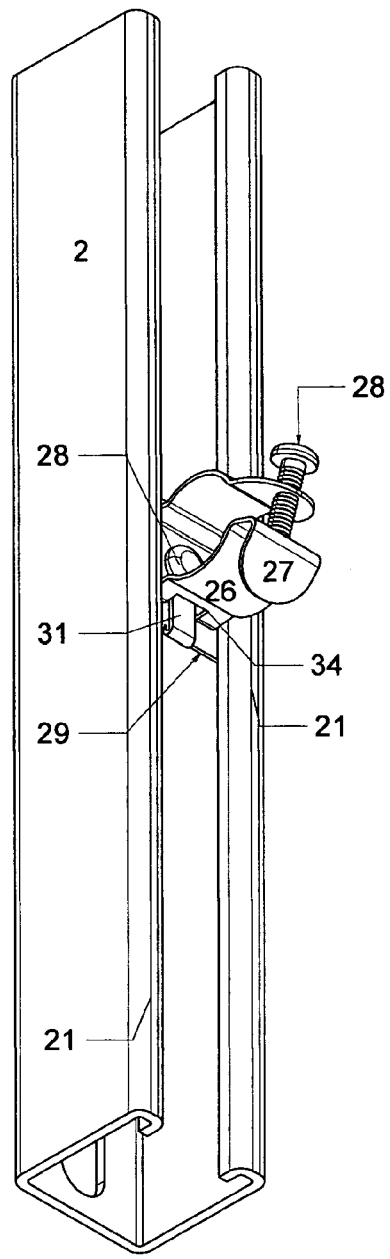

FIG. 36 Isometric view of pipe clamp and strut channel assembly.

FIG. 37 Isometric view of a strut channel with a screw pipe clamp and pipe attached to the open side of the channel and a screw pipe clamp and pipe attached to the connector surface of the strut channel on the back side, as seen from the open side of the strut channel.

FIG. 38 Isometric view of a strut channel with a screw pipe clamp and pipe attached to the open side of the channel and a screw pipe clamp and pipe attached to the connector surface of the strut channel on the back side, as seen from the connector side of the strut channel.

FIG. 39 Isometric view of a screw pipe clamp as seen from the clamp base side.

FIG. 40 Isometric view of a screw pipe clamp along with a clamp retainer for attaching the clamp, on the open side, as seen from the clamp base side.

FIG. 41 Isometric view of a screw pipe clamp as seen from the clamp base side.

FIG. 42 Isometric view of a screw pipe clamp along with a clamp retainer for attaching the clamp, on the open side, as seen from the clamping side.

DRAWINGS

Reference Numerals

1 V Strut
2 Strut channel
3 Flange
4 Slide
5 Connector
6 Tab cut out
7 Dimpled hole
8 Slot hole
9 Tab
10 Beam clip
11 Hanger clip
12 Pre-bent hanger clip
13 Dimple spacer
14 Locking tab
15 Flange spacer
16 Clip Hook
17 Hanger flange
18 Hanger hole
19 Strap
20 Strap hole
21 Strut hook
22 Strap Sling
23 Strap hook
24 Wall plate
25 Round member
26 Pipe clamp
27 Tip protector
28 Self-tapping screw
29 Strut clamp retainer
30 Strut clip hook
31 Bent Retainer
32 Adapter
33 Clamp Insert
34 Clamp cutout
35 Wood Board
36 Nail
37 Clamp insert tab
38 Clamp inside
39 Clamp base
40 Clamp hole
41 Clamp Retainer

DETAILED DESCRIPTION

A V-strut shown in FIGS. 1, 2, 3, 4 embodies a shape that allows attachment of many different objects in many different ways. The strut as seen from the end has two flanges on the same plane with one another, two sides connected at an angle between 90 degrees and 45 degrees from the plane of the flanges and a connector in a parallel plane to the plane of the flanges connecting between the opposite sides.

The flanges turn towards the outside of the strut allowing beam clamps to be used for attaching objects. The flanges in this position also embody a flat area on each side that allows clamps to attach using self-tapping threaded fasteners. The flanges include a series of holes with recesses around them that helps direct the fasteners into the holes. This allows efficient use of power drivers for attaching various clamps to the flanges.

The sides preferably are at an angle less the 90 degrees, adding strength to the strut in all directions. The sides may have a tab cut out that enables strapping with multiple holes to slide through, the tab cut out and bent over the tab capturing it in a hole in the strap. This allows quick attachment and easy re-adjustment by changing which hole hooks over the tab.

The connector is sized to allow use of oblong holes that allow common size fasteners to be inserted thus using common hardware. The inside of the closed end of the strut between the sides of strut channel can be sized to capture the head of a bolt or nut keeping the head from turning without the use of a wrench.

A universal wall mount FIGS. 5, 6, 7 and 8 is created from a section of the V-strut described above along with a wall mount plate, FIG. 7 affixed to the end of the strut. The plate end of the assembly can be attached to a wall or other flat surface with the flange plane running either vertically or horizontally. This assembly, by using the V-Strut or a channel strut (not shown), allows a variety of items to be mounted and spaced away from the surface of the wall in any direction in a parallel plane to the surface of the wall.

Tab cut out 6, along with the included tab 9 are included in the various surfaces of the strut channels 2, V-struts 1, clips, and clamps to allow a strap 19, that has holes along its length to be positioned through the tab cut out and capture the included tab. The strap and a supported load is then held by the tab. The distance of the supported load from the tab cut out 6, can be adjusted by changing which hole is used in the strap 19.

The dimpled hole 7 is included along the various surfaces of the strut channels 2, V-struts 1, hanger clips 11, and pipe clamps 26, providing an efficient way to attach a variety of clamps, straps, and hardware that use self tapping threaded fasteners. Dimples or recesses surrounding the holes on the side of the surface that is to be fastened to help direct the tip of the fastener into the hole. This allows quick use of power or hand drivers to quickly insert the fastener.

The use of beam clamps 10, as shown in FIGS. 14, 15, 16, and 17 and as listed in another patent application, are used to attach items to the V-strut 1. The V-strut 1 has two flanges that allow the beam clamp to be used as it is used to attach to I-beams and other structures. This includes attaching strut channel, rectangular members, round members 25, along with adapters, shields, and padding as is included in the patent application for beam clamps.

The hanger clip 11, is made from metal and is configured to allow connection of a strap, or strip with multiple holes arranged in a series. The hanger clip contains a tab cut out 6, that includes a tab for the strap hole to hook over as described above. It has a clip hook on one end with a flange bent to 150 to 220 degrees enabling it to hook on to the interior portion of the strut channel. The clip is configured in a pre-bent shape prior to being attached to the strut channel. It has a cutout with a bent locking tab 14 in the cut-out that moves into position outside the strut hook, as the clip is straightened during installation, in a way that prevents the clip from being unhooked. It hooks around the inside edge of the strut hook 21 and contains a dimple spacer 13, a flange spacer 15 or other feature that fills up the space between the strut side and inside of the strut hook in a way that prevents the clip hook 16, hook end of the tab, from rotating as the clip is straightened. FIGS. 18, 19, 20, 21, 22, and 23 illustrates in different views of the clip its possible embodiments.

FIGS. 24, 25, 32, and 35 show three ways that connections to this strut channel can be made. First; there is a pipe clamp 26 attached to the connector 5 surface of the strut channel 2 using a self tapping screw 28 passing through the hole in the clamp base 39 and engaging through the a dimpled hole 7 in the connector surface. A second self tapping screw 28 passes through a hole in the longer side of the pipe clamp then engages through a dimpled hole on the shorter side pulling the two sides towards each other and squeezing the pipe and holding it in place.

Second, there is strap 19 with a series of holes running the length of it (not shown) that is capable of attaching to or wrapping around an object (not shown). The strap passes through the tab cut out 6 and hooks over a tab 9 with the strap bent into a strap hook 23. The load is carried by the tab 9. The Tab can be optionally pointed in the opposite direction allowing either the load to be carried on the connector 5 side of the strut channel 2. The strut channel can be supported using a strap 19 passing through a tab cut out 6 in the same manner as described above.

Third, a hanger clip 11 as described above is used to hook on to the strut channel then allow attachment of the strap 19. The strap 19, with a series of holes running the length of it, is capable of attaching to or wrapping around an object (not shown). The strap 19 passes through the tab cut out 6, in the clip, and hooks over a tab 9 with the strap bent into a strap hook 23. The load is carried by the tab 9. The clip optionally provides a method of holding a threaded rod or other fastener. The clip includes a flange that has a hole for a round fastener to pass. This can be used for hanging other objects (not shown).

The pipe clamp 26 provides a method of attaching elongated round members 25, using self tapping screws 28, preferably driven into dimpled holes 7 using a power driver. The strut channel, V-strut, pipe clamp, strut clamp retainer 29, and the different hanger clips 11 shown in the figs have dimpled holes allowing self tapping screws to be used for securing clamps and straps and other objects. They all are part of an overall utility that allows extensive use of self-tapping screws and power drivers. They are not limited in this way.

In FIG. 27 a tip protector 27 bends down over where the tip of the self tapping screw 28 passes, protecting the sharp point from engaging clothing and flesh. This provides a safer way for the screws to be used. The hole on the side of the clamp that the screw is first inserted is further from the clamp base 39 than the dimpled hole 7 on the opposite side that the screw passes second. This causes the head end of the screw to tilt away from the surface to which the clamp base is attached. This further allows enhanced use of a power driver when multiple clamps are used next to each other. By the self tapping screw being on and angled away from the surface to which the pipe clamp is attached, a power driver is not prevented from having straight access to the head of the screw.

A strut clamp retainer 29 is used in conjunction with a pipe clamp 26 for mounting on the open side of a strut channel. The strut clamp retainer 29 is inserted into the opening in a strut channel with the two flanges turned to capture both strut hooks 21. The clamp is then placed against the exposed face of the strut clamp retainer 29 with the clamp insert tab 37 inserted into the clamp cutout 34 such that the slot in the strut clamp retainer 29, and the pipe clamp hole 40, are positioned in line with the dimpled hole 7 on the face of the clamp retainer 29. The clamp insert tab 37, helps hold the pipe clamp in position relative to the strut clamp retainer in order for a self tapping screw to be inserted through the pipe clamp base 39 and engaged into the dimpled hole 7, thus securing the items together. See FIG. 34.

The same embodiments that allow use of power drivers described above can be employed in other pipe and conduit clamps. One such style of clamp is made up of two halves, and hooks into a strut channel as shown in FIGS. 29 and 30. By including a dimpled hole 7 and a tip protector 27 on the short side, the same utilities are added to other clamps now on the market.

Another clip, FIGS. 31 and 33, that also embodies a tab cut out 6 and a tab as previously defined is one that attaches across the two strut hooks 21 on the open side of a strut channel 2, and is attached to a wood board 35 using a nail 36 or screw. It also has a dimpled hole 7 and optionally a hanger flange 17 that includes a hanger hole 18. An added component is a bent retainer 31 that is inserted in between the strut hooks 21 of the open side of the strut channel 1. The hanger clip 11 is hooked on the inside of the strut channel 1 and positioned against the bent retainer 31; then a self tapping screw 28 is inserted through the bent retainer 31 and engaged in the dimpled hole 7 in the hanger clip 11. The addition of the bent retainer 31 prevents the hanger clip 11 from becoming dislodged from the strut channel 2.

ADVANTAGES

My invention provides improvements in ways objects are attached to each other and provides methods for attaching not currently feasible. Strut channels, pipes, conduits, boards and other members and objects can be attached using screws, beam clamps or hanger straps.

CONCLUSION, RAMIFICATION, AND SCOPE

This invention allows attachment of channel struts, pipes, conduit, to the interior of buildings in ways not currently done due to a lack of an efficient and strong way for attachment to structures such as I-Beams and truss structures. Extended use of self tapping screws and commonly used metal strapping are enabled by my invention. A number of new methods for attaching or mounting hardware are made available by this invention and in combination with beam clamps, another invention of mine, using the clamp bodies along with appropriate accessories that are part of that invention.

I claim:

1. A V-strut comprising a base, two sides and two flanges, connected together and forming an elongated channel with a cross section generally like that of a hat, configured to allow multiple types of clamps and attachment devices to be fastened to it and comprised of:
   a base surface making up a bottom portion of the channel wide enough to incorporate predetermined sizes of holes, slots and cutouts;
   two side surfaces with an edge of each connected to the two opposite sides of the base surface at an angle of between 70 and 130 degrees forming a channel; and
   one of the two flanges connected to each of the side surfaces and turned outward away from a channel area, formed between the sides and wide enough to allow placement of holes in the flanges, to form a planar area with outward facing edges that allow beam clamps to be used and has dimpled holes in the flanges that simplify the insertion and use of self tapping threaded fasteners, with depressions around the hole that facilitates the tip of the fastener movement toward and into the hole;
   and further may include a cutout in the side sized and shaped for a hanger strap with holes to pass, hook over a tab incorporated and protruding into the interior portion of said cutout which is sized to allow holes in the strap to capture the tab; more than one tab is possible and could extend in different directions.

2. The V-strut according to claim 1 wherein a wall plate is abutted and attached to the end of the strut with strut located in the center portion and perpendicular to a mounting plate with the plate including multiple holes for fasteners to pass allowing the assembly to be attached perpendicular to a surface and rotated in multiple direction.

3. The strut channel comprised of:
- a base surface making up a bottom portion of the channel wide enough to incorporate predetermined sizes of holes, slots and cutouts;
- two side surfaces with an edge of each connected to the two opposite sides of the base surface at an angle of between 70 and 130 degrees forming a channel;
- each of said two side surfaces comprising a flange turned inwardly and down toward the base surface; and
- dimpled holes in the flanges and the side surfaces that simplify the insertion and use of self tapping threaded fasteners having a head with power drivers wherein the dimpled holes comprise holes and recess around the holes wherein the recess around the hole facilitates the tip of the fastener movement toward and into the hole but for the head of the self tapping threaded fastener to extend beyond the recess, wherein the dimpled holes are of a predetermined size that facilitate the insertion of self-tapping screws along the length of the strut channel spaced along the base surface or side surfaces to facilitate the attachment of various clamps or attachment hardware at any desired spacing along the base surface or the side surfaces using self tapping fasteners.

* * * * *